United States Patent Office 2,827,470
Patented Mar. 18, 1958

2,827,470

POLYHYDROXY ALCOHOL ESTERS OF SULFAMYLCARBANILIC ACID

Ferdinand C. Meyer, Kirkwood, Mo., assignor to Monsanto Chemical Company, St. Louis, Mo., a corporation of Delaware No Drawing. Application December 29, 1955
Serial No. 556,100

6 Claims. (Cl. 260—397.7)

This invention relates to a new class of chemical compounds having unusual properties as are hereinafter described. More specifically the invention relates to esters of p-sulfamylcarbanilic acid.

Although sulfanilamide is well known as a bactericide and has wide biological utility, the esters of sulfamylcarbanilic acid do not possess this general utility. Accordingly, one purpose of this invention is to produce new esters of p-sulfamylcarbanilic acid which have biological activity. A further purpose is to provide methods of deriving esters of p-sulfamylcarbanilic acid from sulfanilamide. Other purposes will be apparent from the following specification.

In accordance with this invention it has been found that chemical compounds of the following structure are new and useful.

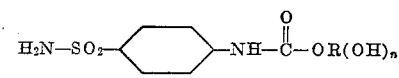

wherein $n$ is an integer from 1 to 6 and R is an aliphatic radical of the group consisting of hydrocarbons and oxahydrocarbons having from 2 to 12 carbon atoms.

The new compounds are prepared from sulfanilamide by first converting it to the corresponding isocyanate by reaction with phosgene, and then reacting the product, p-sulfamylphenyl isocyanate, with a suitable aliphatic polyhydroxy alcohol, whereupon an ester of the new class of compounds is prepared.

A wide variety of polyhydroxy alcohols may be used in the synthesis of the new compounds, for example the alkylene glycols, such as ethylene glycol, 1,3-propylene glycol, 1,2 - pyropylene glycol, tetramethylene glycol, other isomeric butylene glycols and the higher alkylene glycols containing up to 12 carbon atoms; the oxahydrocarbon glycols such as diethylene glycol, triethylene glycol, 1,2 - pyropylene glycol, tetramethylene glycol, other ether glycols having up to 12 carbon atoms; and the polyhydroxy alcohols containing more than two carbon atoms such as glycerol, erythrol, mannitol, and pentaerythritol.

It has been found that the use of glycols is more satisfactory, because the polyhydroxy alcohols having more than two hydroxyl groups result in the formation of difficultly separable isomeric esters of p-sulfamylcarbanilic acid. Furthermore, the shorter chained glycols are more available and more useful in the preparation of the new esters. Thus a generic formula for the preferred type of new compound is:

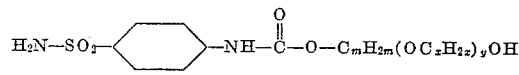

wherein $m$ and $x$ are integers from two (2) to four (4) and $y$ is an integer from zero (0) to four (4).

Although the sulfanilamide from which the new compounds are derived is well known as a bactericide, the esters of sulfamylcarbanilic acid do not exhibit general toxic activity with respect to bacteria. The compounds have, however, been found to be effective in the inhibition of the tobacco mosaic virus. Other specialized biological activity has been observed.

Further details of the preparation of the new compounds are set forth in the following examples.

Example 1

A reaction vessel is charged with 500 ml. of tetrahydrofuran and the vessel and its contents are cooled to 0° C. in a mixture of ice and salt. Phosgene gas is passed into the tetrahydrofuran until approximately 170 g. has been condensed. The temperature is then raised to approximately 8–10° C. and a solution of 284 g. of sulfanilamide in 2100 ml. of tetrahydrofuran is added over a period of two to three hours, with constant agitation and cooling.

The reaction mixture is stirred for an hour while maintaining the temperature. The slurry is quickly filtered and evaporated to about one-half its normal size. The filtrate is cooled to 8° C. and 260 g. of ethylene glycol added. Pyridine is then added dropwise to the cooled reaction mixture, while maintaining the temperature at 8° C. The mixture is stirred for an additional hour at 8° C. the lower layer in the reaction vessel is separated and heated under vacuum to evaporate the excess tetrahydrofuran and slowly poured into 2 liters of cold tap water. The mixture is stirred and filtered, the filter cake being discarded. The filtrate is acidified with hydrochloric acid to the Congo red endpoint. The product which is crystallized upon cooling is recrystallized from a minimum amount of boiling water. A substantial yield of a 2-hydroxyethyl p-sulfamylcarbanilate is recovered.

Example 2

A one liter flask fitted with a gas-inlet tube, stirrer, a reflux condenser sealed by a Drierite tube, and a thermometer is charged with 86 g. of sulfanilamide with 650 ml. of ethyl acetate. Hydrogen chloride is passed into the flask until saturation is reached. Phosgene gas was introduced into the reaction flask with vigorous agitation until the slurry becomes a clear solution at the reflux temperature of ethyl acetate. This requires from two (2) to four (4) hours. The solution is filtered and evaporated to dryness in a vacuum. A substantial yield of p-sulfamylphenyl isocyanate is recovered which is added slowly to a two molar quantity of ethylene glycol. This exothermic reaction increased the temperature to between 60–80° C. The mass is allowed to stand until cooled to room temperature and is dissolved in a minimum quantity of boiling water and recrystallized. This forms 2-hydroxyethyl p-sulfamyl-carbanilate in a 65 to 70% yield.

Example 3

The flask described in the second example is charged with 60 g. of sulfanilamide and 700 ml. of ethyl acetate. After saturation with hydrogen chloride, 3 mols of liquid phosgene is added as rapidly as possible. The slurry usually clears in 20 to 30 minutes. The reaction mixture is fractionated to remove the hydrogen chloride and the excess phosgene, and then 2 mols of ethylene glycol is added with vigorous stirring. The mixture becomes homogeneous followed by a sudden exothermic reaction. A white granular precipitate results. After recrystallization from hot water, 2-hydroxyethyl p-sulfamylcarbanilate is recovered.

Example 4

A 5 liter reaction flask is charged with 1,000 ml. to tetrahydrofuran and 300 g. of phosgene is condensed therein while maintaining the reaction flask in an ice bath. A solution of 500 g. of sulfanilamide in 3,000 ml. of tetrahydrofuran is then gradually added at a rate which permits the maintenance of the temperature below 10° C., four hours being required. The reaction mixture is stirred to assure a complete reaction. After filtering the mixture the filtrate is cooled to approximately 0° C. and 400 g. of diethylene glycol is added. Pyridine is then added at a rate which permits the maintenance of a temperature below 10° C. When the reaction subsides as evidenced by the temperature change, the pyridine addition is stopped, but the stirring is continued for 90 minutes. The reaction mixture separates into two aqueous phases, and the lower layer is separated, heated at reduced pressures to evaporate the excess solvent and slowly poured into a mixture of ice and water. The mixture is then filtered and the filtrate acidified with hydrochloric acid. The product which separated upon cooling is dissolved in boiling water and recrystallized. The compound so produced is identified as 5-hydroxy-3-oxa-n-pentyl p-sulfamylcarbanilate.

*Example 5*

The process of Example 3 is repeated except glycerol is used in place of ethylene glycol. The product recovered cannot be crystallized, but it is obviously a mixture of isomeric dihydroxypropyl esters of p-sulfamylcarbanilate.

What is claimed is:

1. A compound having the structure

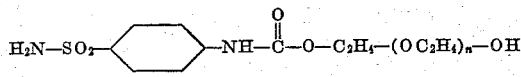

wherein $n$ is an integer from zero (0) to three (3).

2. The process which comprises adding phosgene and sulfanilamide to an organic solvent, adding gradually to the reaction mixture a tertiary amine until the reaction is substantially complete, contacting the resulting sulfamylphenyl isocyanate with a glycol having the structure $$H(OC_2H_4)_n\text{---}OH$$

wherein $n$ is an integer from one (1) to four (4), and separating the resulting p-sulfamylcarbanilate.

3. The compound 2-hydroxyethyl p-sulfamylcarbanilate.

4. The compound 5-hydroxy-3-oxa-n-pentyl p-sulfamylcarbanilate.

5. The process which comprises adding phosgene and sulfanilamide to an organic solvent, adding pyridine gradually until the reaction is complete, contacting the p-sulfamylphenyl isocyanate with ethylene glycol and separating the 2-hydroxyethyl p-sulfamylcarbanilate.

6. The process which comprises adding phosgene and sulfanilamide to an organic solvent, adding pyridine gradually until the reaction is complete, contacting the p-sulfamylphenyl isocyanate with diethylene glycol and separating the 2-hydroxyethyl p-sulfamylcarbanilate.

References Cited in the file of this patent

UNITED STATES PATENTS 2,234,018    Bigelow ---------------- Mar. 4, 1941

OTHER REFERENCES

Thompson et al.: Chem. Abst., 41, 3905 (1947).
Mikhalev et al.: Chem. Abst., 42, 2933 (1948).
Wagner et al.: "Synthetic Organic Chemistry." J. Wiley, 1953, p. 640.

UNITED STATES PATENT OFFICE

CERTIFICATE OF CORRECTION

Patent No. 2,827,470             March 18, 1958

Ferdinand C. Meyer

It is hereby certified that error appears in the printed specification of the above numbered patent requiring correction and that the said Letters Patent should read as corrected below.

Column 1, line 51, for "glycol, 1,2-propylene glycol, tetramethylene glycol," read -- glycol, tetraethylene glycol, the dipropylene glycols, --.

Signed and sealed this 5th day of August 1958.

(SEAL)
Attest:

KARL H. AXLINE
Attesting Officer

ROBERT C. WATSON
Commissioner of Patents